United States Patent [19]
Quirk

[11] 3,773,583
[45] Nov. 20, 1973

[54] TWO-STAGE FILAMENT WINDING OF T-SHAPED HOLLOW PRODUCTS

[75] Inventor: Robert W. Quirk, Los Angeles, Calif.

[73] Assignee: Rheem Fluid Systems, Inc., Chatsworth, Calif.

[22] Filed: Dec. 17, 1971

[21] Appl. No.: 209,185

[52] U.S. Cl............ 156/175, 156/169, 156/172, 156/173, 156/425, 156/446
[51] Int. Cl............................................. B65h 81/02
[58] Field of Search............... 156/169, 172, 173, 156/175, 425, 446, 457, 431; 285/156; 242/7.21, 7.22

[56] References Cited
UNITED STATES PATENTS
2,878,038   3/1959   Noland .......................... 285/156
3,578,532   5/1971   Thaden .......................... 156/172
FOREIGN PATENTS OR APPLICATIONS
1,150,700   8/1957   France ........................... 285/156

686,209   5/1964   Canada ........................... 156/173

Primary Examiner—Daniel J. Fritsch
Attorney—Ford W. Harris, Jr. et al.

[57] ABSTRACT

A two stage method of making a T-shaped hollow product of reinforcing material impregnated with a synthetic resin. During the first stage, the synthetic resin impregnated reinforcing material is wound at various angles around a mandrel body carrying a laterally extending, bullet shaped neck portion, any windings which engage the bullet shaped neck portion sliding laterally inwardly therealong to regions adjacent the base thereof. In the second stage, the bullet shaped neck portion is replaced by a second neck portion at least part of which is generally cylindrical, the synthetic resin impregnated reinforcing material being wound around such second neck portion to form the leg of the T-shaped hollow product. The result of this two stage technique is a concentration of winding material at the junction of the body and the neck of the T-shaped hollow product for greater strength.

2 Claims, 12 Drawing Figures

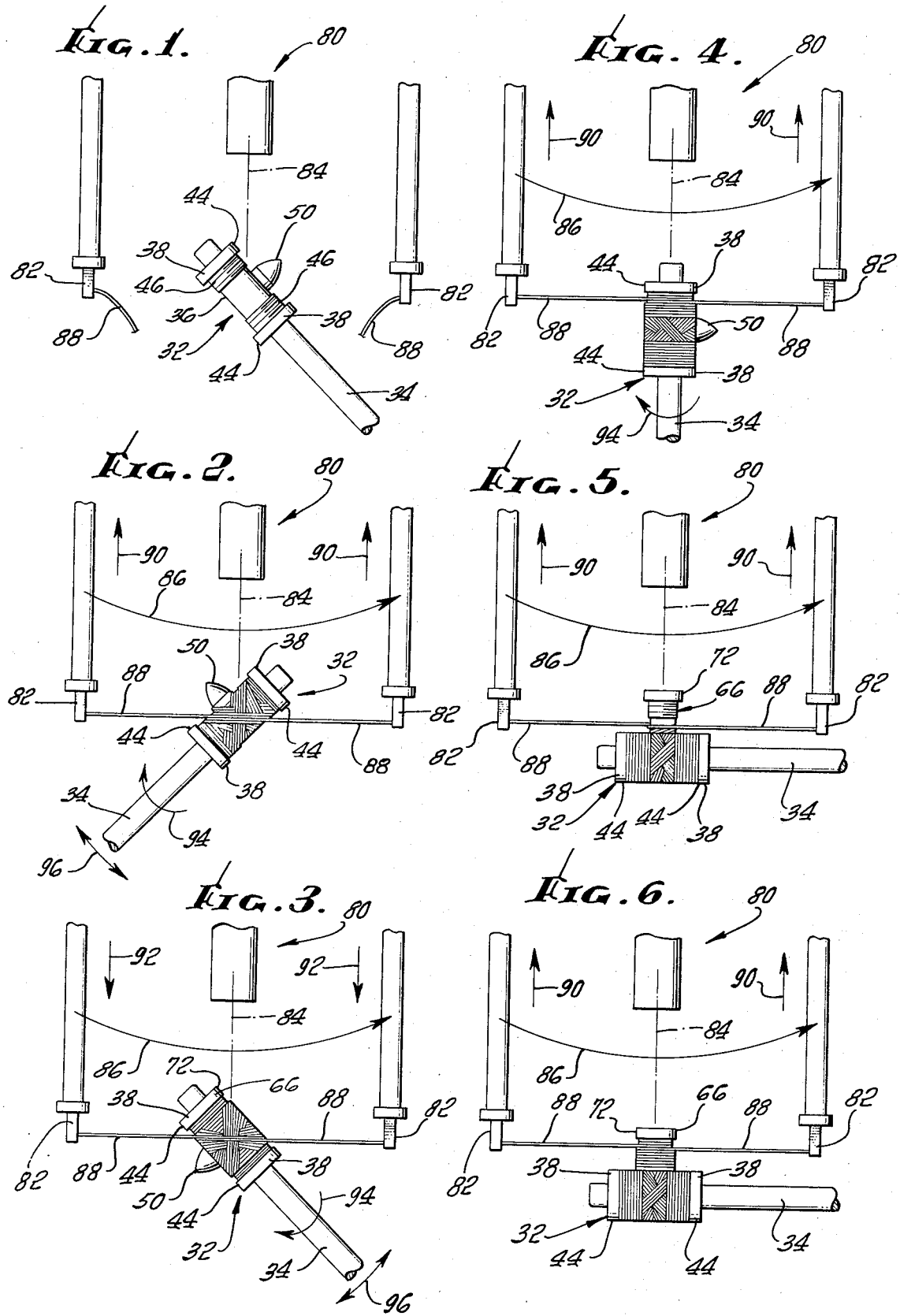

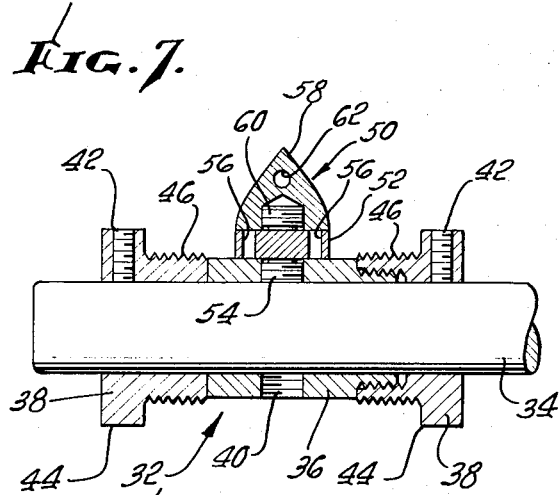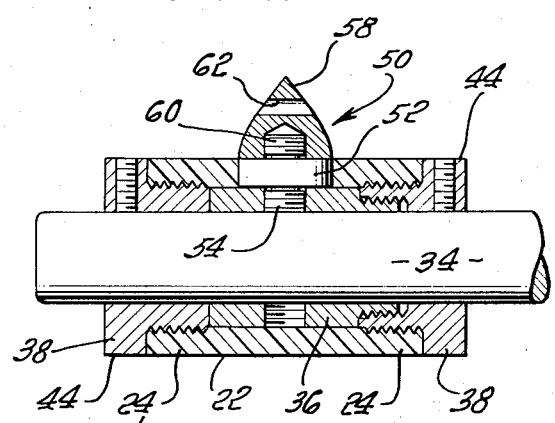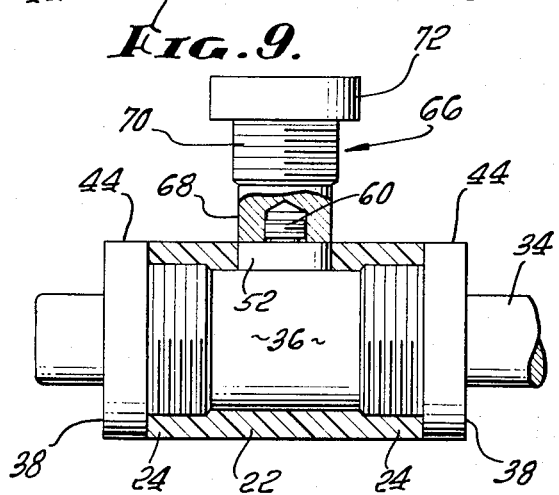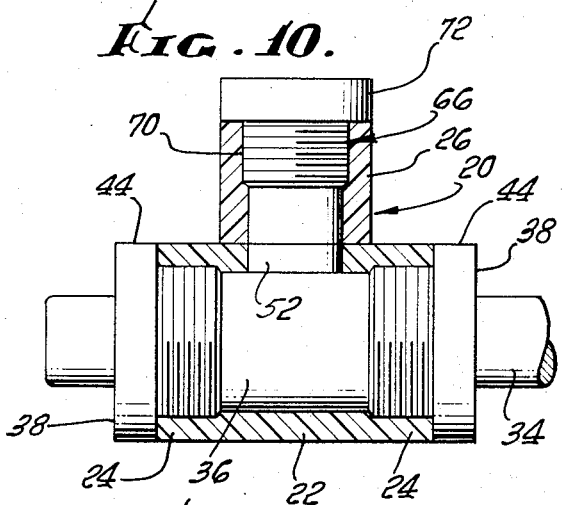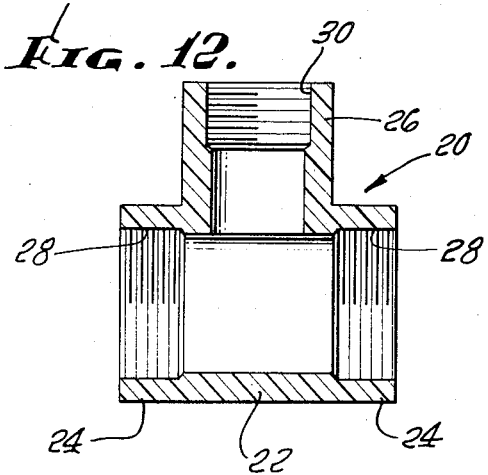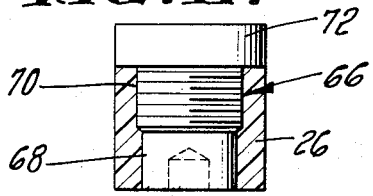

TWO-STAGE FILAMENT WINDING OF T-SHAPED HOLLOW PRODUCTS

BACKGROUND OF INVENTION

The present invention relates in general to the so-called filament winding art and, more particularly, to the art of reinforcing molded synthetic resin articles with windings of reinforcing material, such as fiber glass. Although the reinforcing material may actually comprise single filaments, it may also comprise fiber glass roving and/or woven fiber glass type and/or a combination of either or both of these with fiber glass mat and/or fabric.

More specifically, the invention relates to a T-shaped hollow article, such as a pipe fitting or a valve body, made of a molded synthetic resin which is fiber reinforced, preferably by windings of fiber glass roving and tape, as hereinbefore indicated. The reinforcing windings may be impregnated with any suitable synthetic resin, such as epoxy, polyester, or the like.

As further background, the invention contemplates a fiber reinforced, molded, T-shaped hollow product comprising a body having longitudinally spaced end portions and a laterally extending neck portion, the end portions defining a longitudinal axis of the article and the neck portion defining a lateral axis thereof. The invention still further contemplates the use of a T-shaped mandrel which includes a body having longitudinally spaced end portions providing a longitudinal axis and a laterally extending neck portion providing a lateral axis.

The invention resides in the manner in which the body and neck portions of the mandrel are wound with resin impregnated fiber glass roving and tape, or other reinforcing material, to form the corresponding parts of the fiber reinforced, molded pipe fitting or valve body, or other T-shaped hollow article.

SUMMARY AND OBJECTS OF INVENTION

The primary object of the invention is to concentrate winding material at the junction of the body and neck portions of the T-shaped hollow article for greater strength.

More particularly, the primary object of the invention is to provide a two stage winding method which involves: providing a mandrel body having longitudinally spaced end portions; connecting to the mandrel body intermediate its end portions a laterally extending, bullet shaped neck portion; winding synthetic resin impregnated reinforcing material around the mandrel body at various angles to the longitudinal axis thereof, any windings which engage the bullet shaped neck portion sliding laterally inwardly therealong to regions adjacent the base thereof; replacing the bullet shaped neck portion with a second neck portion at least part of which is generally cylindrical; and winding synthetic resin impregnated reinforcing material around the second neck portion.

With the foregoing procedure, the reinforcing material is concentrated at the junction of the body and neck portions of the T-shaped hollow article for added strength, which is an important feature.

Another object of the invention is to provide a mandrel for use in the foregoing method which includes: a mandrel body having spaced end portions; a laterally extending, bullet shaped, neck portion connectible to the mandrel body intermediate its end portions; and a second neck portion which is interchangeable with the bullet shaped neck portion and at least part of which is generally cylindrical.

The foregoing objects, advantages, features and results of the present invention, together with various other objects, advantages, features and results thereof which will be evident to those skilled in the so-called filament winding art in the light of this disclosure, may be achieved with the exemplary embodiment of the invention illustrated in the accompanying drawings and described in detail hereinafter.

DESCRIPTION OF DRAWINGS

In the drawings:

FIG. 1 is a semidiagrammatic view of a T-shaped mandrel of the invention and of a machine for winding synthetic resin impregnated reinforcing material around the mandrel in accordance with the invention, the mandrel being shown as having, initially, a bullet shaped neck portion;

FIGS. 2, 3 and 4 are views similar to FIG. 1, but showing various steps in the winding of the mandrel, with its bullet shaped neck portion, with synthetic resin impregnated reinforcing material;

FIGS. 5 and 6 are views similar to FIGS. 1 to 4, but illustrating the winding of a second neck portion with synthetic resin impregnated reinforcing material in the second stage of the method of the invention, the second neck portion having replaced the bullet shaped neck portion of the first stage and having at least a part which is generally cylindrical;

FIG. 7 is a longitudinal sectional view of the mandrel with its bullet shaped neck portion;

FIG. 8 is a view similar to FIG. 7, but showing the mandrel wound with resin impregnated reinforcing material;

FIG. 9 is a view similar to FIG. 8, but showing the bullet shaped neck portion replaced with the at least partly cylindrical second neck portion;

FIG. 10 is a view similar to FIG. 9, but showing the second neck portion wound with resin impregnated reinforcing material;

FIG. 11 is a view showing the second neck portion of FIG. 10 removed from the mandrel body for clarity; and FIG. 12 is a longitudinal section view showing the final T-shaped hollow article, the mandrel having been removed therefrom.

DETAILED DESCRIPTION OF EXEMPLARY EMBODIMENT OF INVENTION

Referring initially to FIG. 12 of the drawings, designated generally therein by the numeral 20 is a T-shaped hollow article made in accordance with the invention, the article being formed of a synthetic resin reinforced with windings of fiber reinforcing material, such as the fiber glass filament, roving and/or tape hereinbefore discussed.

The article or product 20 includes a body portion 22 having longitudinally spaced end portions 24 and a laterally extending neck portion 26. In the particular construction illustrated, the end and neck portions 24 and 26 are internally threaded at 28 and 30, respectively. The internal threads at 28 and 30 are molded threads, as will become apparent.

The T-shaped hollow product 20 is made in a two stage winding operation the first stage of which utilizes a mandrel 32, best shown in FIG. 7. The mandrel 32 is carried by a shaft 34 and includes a mandrel body comprising a central body portion 36 and two end portions 38. The end portions 38 are separate pieces one of which merely abuts the central portion 36 and the other of which is shown as threaded thereonto. The central and end portions 36 and 38 are secured by set screws 40 and 42, respectively. The end portions 38 are provided with winding limiting flanges 44, and are provided with external threads 46 to form the internal threads 28 of the final product 20.

The mandrel 32, in its first stage condition, includes a laterally extending, bullet shaped, neck portion 50 connected to the central portion 36 of the mandrel body intermediate the end portions 38 thereof. More particularly, the neck portion 50 includes a cylindrical base 52 having a stud 54 threaded into the central portion 36, holes 56 for a suitable wrench being provided in the base. The neck portion 50 further includes a laterally outwardly tapering nose 58 into which another stud 60 on the base 52 is threaded, the nose being provided with a transverse hole 62 for a suitable wrench.

In its second stage condition, the bullet shaped neck portion 50 of the mandrel 32 is replaced by a second neck portion 66, FIG. 9, which is at least partly cylindrical. More particularly, the second neck portion 66 includes a cylindrical portion 68 seated on the base 52 and secured by the stud 60. Laterally outwardly of the cylindrical portion 68 is an externally threaded portion 70 for forming the internally threaded portion 30 of the neck portion 26 of the final product 20. Outwardly of the threaded portion 70 is a winding limiting annular flange 72 corresponding to the winding limiting annular flanges 44 on the end portion 38 of the mandrel body.

Turning now to FIGS. 1 to 6 of the drawings, diagrammatically illustrated therein is a winding machine 80 which includes two reinforcing material guides 82 capable of orbiting around a vertical axis 84, as indicated by the arrow 86. The guides 82 supply strands 88 of synthetic resin impregnated reinforcing material to the mandrel 32, such Strands being fiber glass filaments, roving and/or tape as hereinbefore discussed. The mandrel 32 is positioned with the intersection of its longitudinal and lateral axes on the axis 84 of the winding machine 80, as best shown in FIG. 1 of the drawings.

The guides 82 are movable upwardly and downwardly, as indicated by the respective arrows 90 and 92 in FIGS. 2 to 6. The shaft 34 carrying the mandrel 32 is rotatable about its axis, as indicated by the arrow 94, and the angle of the shaft axis relative to the machine axis 84 may also be varied, as indicated by the double headed arrow 96.

As will be clear from FIGS. 2 to 4, various patterns of windings may be applied to the mandrel 32 by moving the guides 82 upwardly and downwardly and by varying the angle of the longitudinal axis of the mandrel relative to the axis 84 of the winding machine 80. For example, FIGS. 2 and 3 illustrate applying diagonal windings at two different main angles, which main angles can also be varied by shifting the position of the mandrel shaft 34 as indicated by the arrows. FIG. 4 illustrates how helical windings can be applied to the end portions 38 of the mandrel 32.

By repeating the winding procedures of FIGS. 2, 3 and 4 several times, the synthetic resin impregnated reinforcing material is built up on the body of the mandrel 32 to the peripheries of the end flanges 44 and to at least the top of the base 52 of the bullet shaped neck portion 50, as shown in FIG. 8. During this first stage of the winding operation, any windings which engage the nose 58 of the bullet shaped neck portion 50 slide laterally inwardly therealong to regions adjacent the base 52 thereOf, particularly when applying diagonal windings as shown in FIGS. 2 and 3. The net result of this is that the windings are concentrated in the body portion 22 of the ultimate product 20 at the junction of the body portion with the neck portion 26, for added strength in this region, which is an important feature of the invention.

Upon completion of the foregoing first winding stage, the bullet shaped neck portion 50 is replaced by the second neck portion 66, as shown in FIG. 9. Then, as shown in FIGS. 5 and 6, synthetic resin impregnated reinforcing material is wound helically on the second neck portion 66 until it is built up to the desired thickness. If desired, an additional layer or layers of windings, not shown, may be applied to the body of the mandrel 32 after, or concurrently with, the application of windings to the second neck portion 66. This procedure further concentrates windings at the junction of the body and neck portions 22 and 26 of the final article.

Although an exemplary embodiment of the invention has been disclosed herein for purposes of illustration, it will be understood that various changes, modifications and substitutions may be incorporated in such embodiments without departing from the spirit of the invention as defined by the claims appearing hereinafter.

I claim as my invention:

1. A method of making a hollow product, including the steps of:
 a. providing a generally cylindrical mandrel body;
 b. connecting to said mandrel body a laterally extending, bullet shaped, neck portion;
 c. winding synthetic resin impregnated reinforcing material around said mandrel body at various angles thereto, any windings which engage said bullet shaped neck portion sliding laterally inwardly therealong to regions adjacent the base thereof;
 d. replacing said bullet shaped neck portion with a second neck portion at least part of which is generally cylindrical; and
 e. wInding synthetic resin impregnated reinforcing material at least around said second neck portion.

2. A method of making a T-shaped hollow product, including the steps of:
 a. providing a generally cylindrical mandrel body having longitudinally spaced end portions;
 b. connecting to said mandrel body intermediate its end portions a laterally extending, bullet shaped, neck portion;
 c. winding synthetic resin impregnated reinforcing material around said mandrel body at various angles to the longitudinal axis thereof, any windings which engage said bullet shaped neck portion sliding laterally inwardly therealong to regions adjacent the base thereof;
 d. replacing said bullet shaped neck portion with a second neck portion at least part of which is generally cylindrical; and
 e. winding synthetic resin impregnated reinforcing material at least around said second neck portion.

* * * * *

UNITED STATES PATENT OFFICE
CERTIFICATE OF CORRECTION

Patent No. 3,773,583     Dated November 20, 1973

Inventor(s) Robert W. Quirk

It is certified that error appears in the above-identified patent and that said Letters Patent are hereby corrected as shown below:

Column 1, line 11, "type" should be --tape--

Column 2, line 46, "section" should be --sectional--

Column 3, line 34, "portion" should be --portions-- line 42, "Strands" should be --strands--

Column 4, line 7, "thereOf" should be --thereof-- line 48, (Claim 1, e.); "wInding" should be --winding--

Signed and sealed this 16th day of April 1974.

(SEAL)
Attest:

EDWARD M. FLETCHER, JR.
Attesting Officer

C. MARSHALL DANN
Commissioner of Patents